April 8, 1924.  1,489,723
F. A. WEIMANN ET AL
MACHINE FOR CLOSING COLLAPSIBLE TUBES
Filed Oct. 14, 1922    9 Sheets-Sheet 6
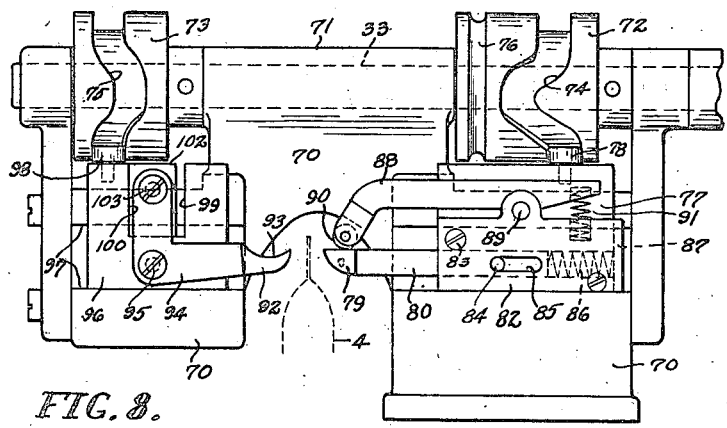
FIG. 8.
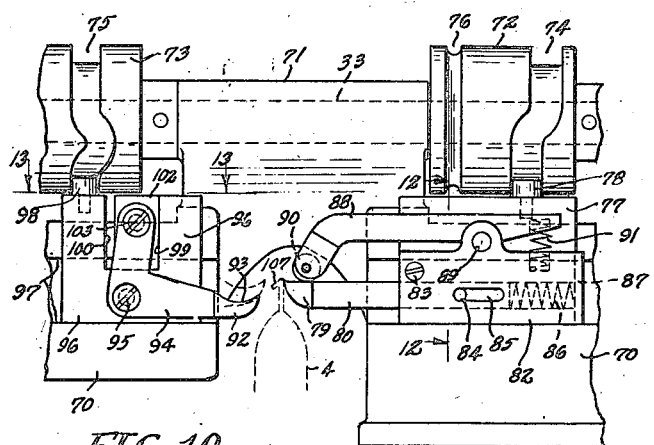
FIG. 10.
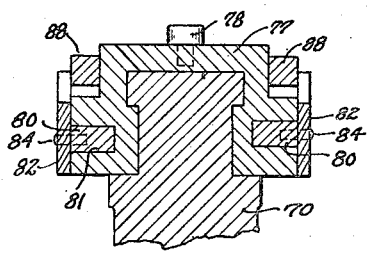
FIG. 12.
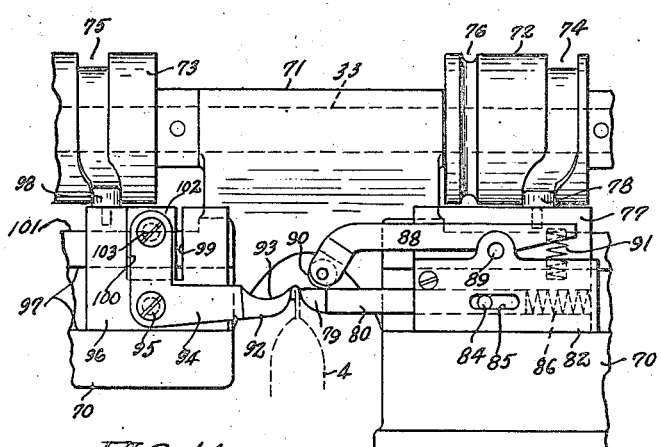
FIG. 11.
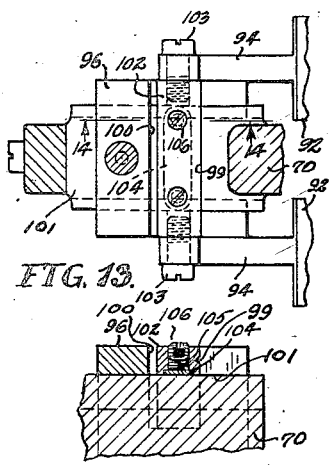
FIG. 13.
FIG. 14.
INVENTORS
Ferdinand A. Weimann
and William B. Funk
BY
Wooster & Davis
ATTORNEYS.

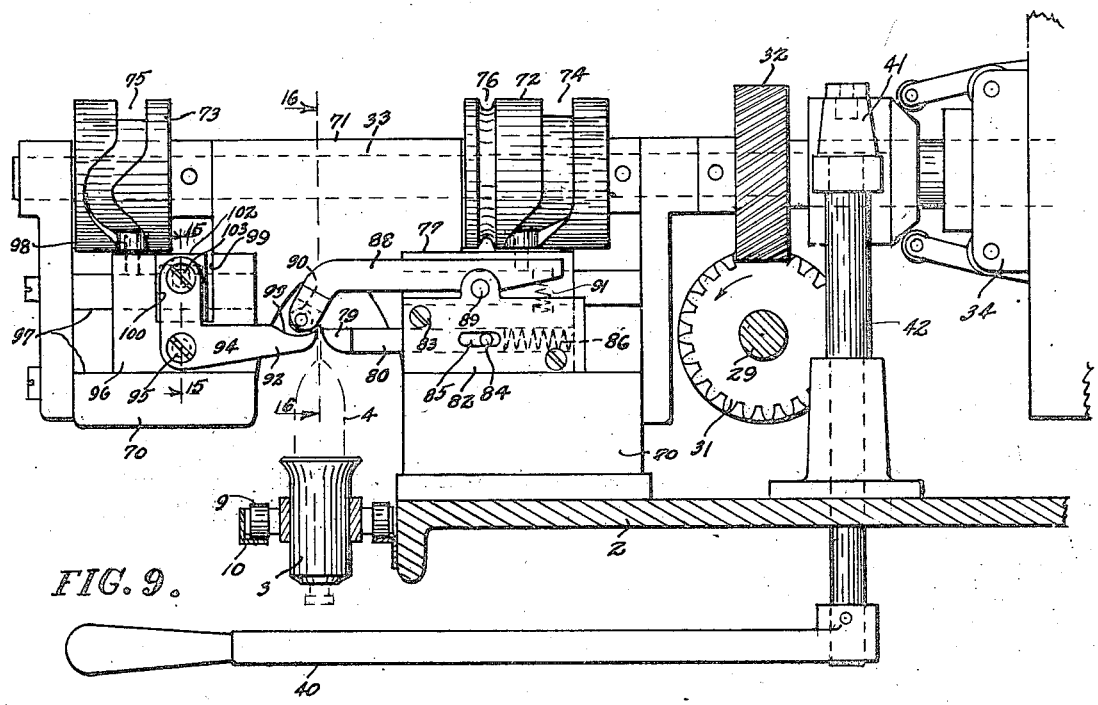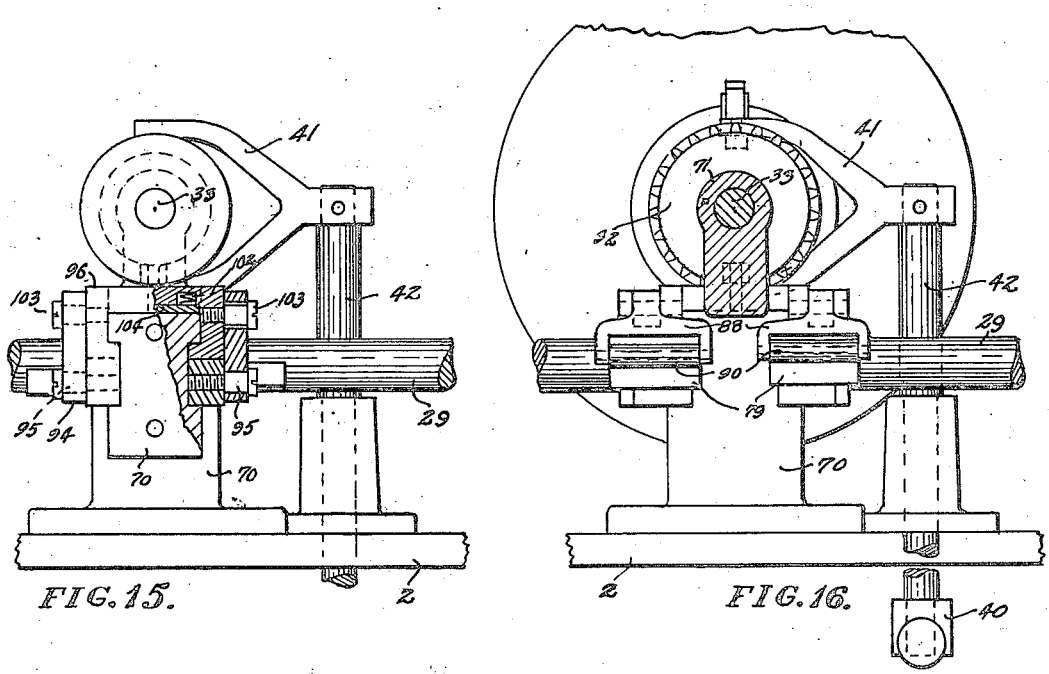

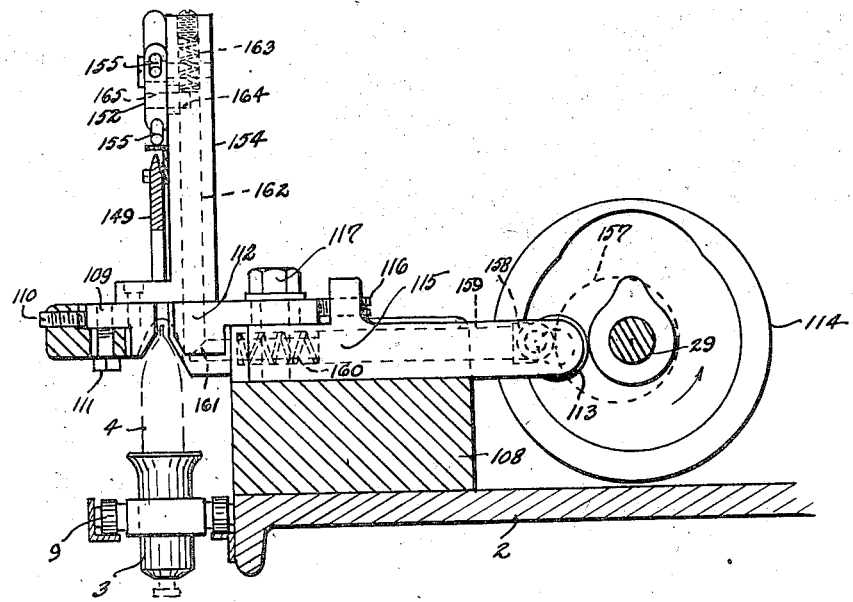
FIG. 17.
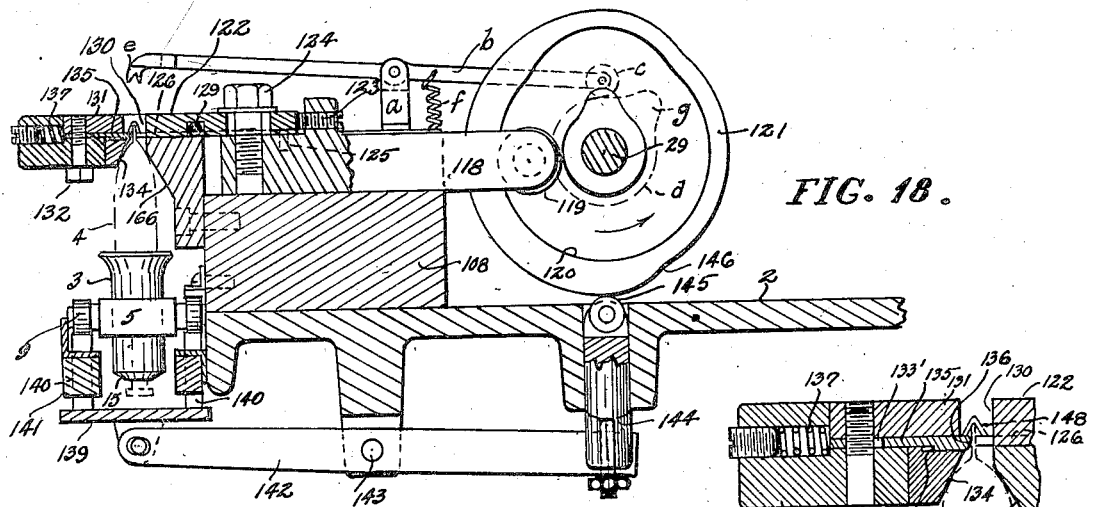
FIG. 18.
FIG. 18a.
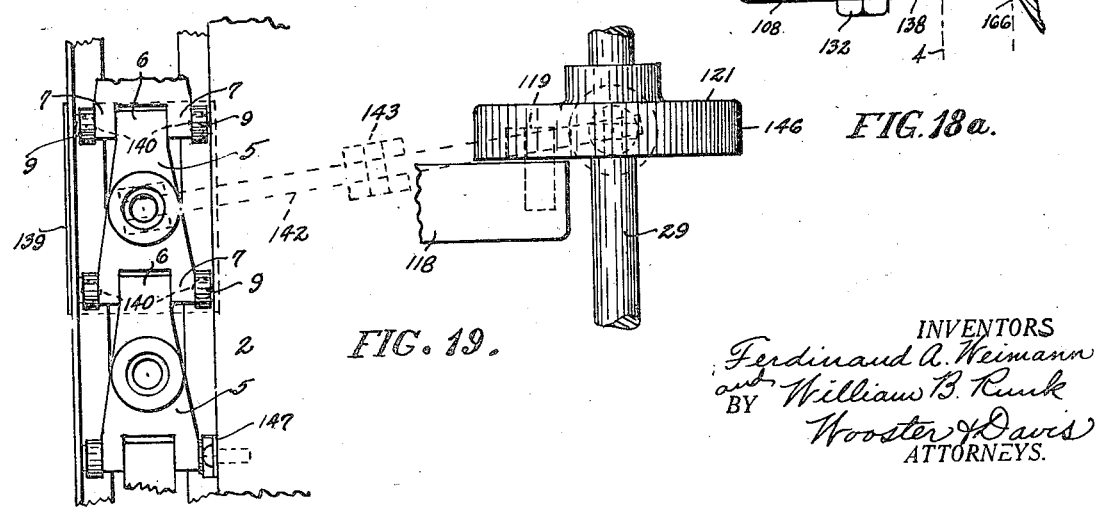
FIG. 19.

April 8, 1924. 1,489,723
F. A. WEIMANN ET AL
MACHINE FOR CLOSING COLLAPSIBLE TUBES
Filed Oct. 14, 1922 9 Sheets-Sheet 9

INVENTORS
Ferdinand A. Weimann
William B. Runk
BY Wooster & Davis
ATTORNEYS.

Patented Apr. 8, 1924.

1,489,723

UNITED STATES PATENT OFFICE.

FERDINAND A. WEIMANN AND WILLIAM B. RUNK, OF SHELTON, CONNECTICUT, ASSIGNORS TO THE WEIMANN BROTHERS MANUFACTURING COMPANY, OF DERBY, CONNECTICUT, A CORPORATION OF CONNECTICUT.

MACHINE FOR CLOSING COLLAPSIBLE TUBES.

Application filed October 14, 1922. Serial No. 594,502.

*To all whom it may concern:*

Be it known that we, FERDINAND A. WEIMANN and WILLIAM B. RUNK, citizens of the United States, residing at Shelton, county of Fairfield, State of Connecticut, have invented an Improvement in Machines for Closing Collapsible Tubes, of which the following is a specification.

This invention relates to a machine for automatically closing and sealing filled collapsible tubes such as are used for tooth paste, shaving cream and the like, and has for an object to provide a machine which will automatically perform all the operations of closing the tube, folding the closed end of the tube, placing a sealing clip thereover, clamping the clip in position and dating, with no hand operations required, except that of placing the tubes in th conveyer which carries them to the mechanism for performing the various operations mentioned.

With these and other objects in view, we have devised the construction illustrated in the accompanying drawings in which.

Figure 7:
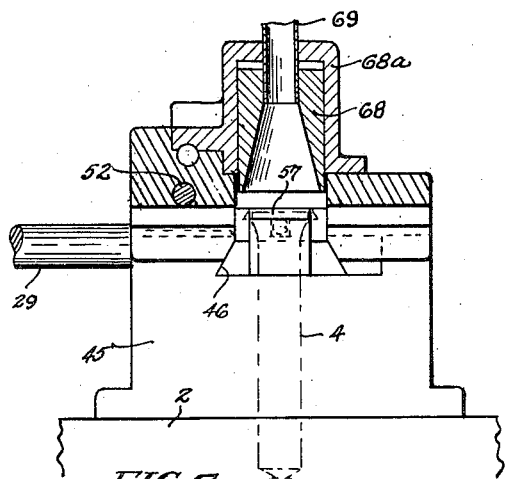
Fig. 7 is a transverse section substantially on line 7—7 of Figs. 5 and 7ª.
Figure 7A:
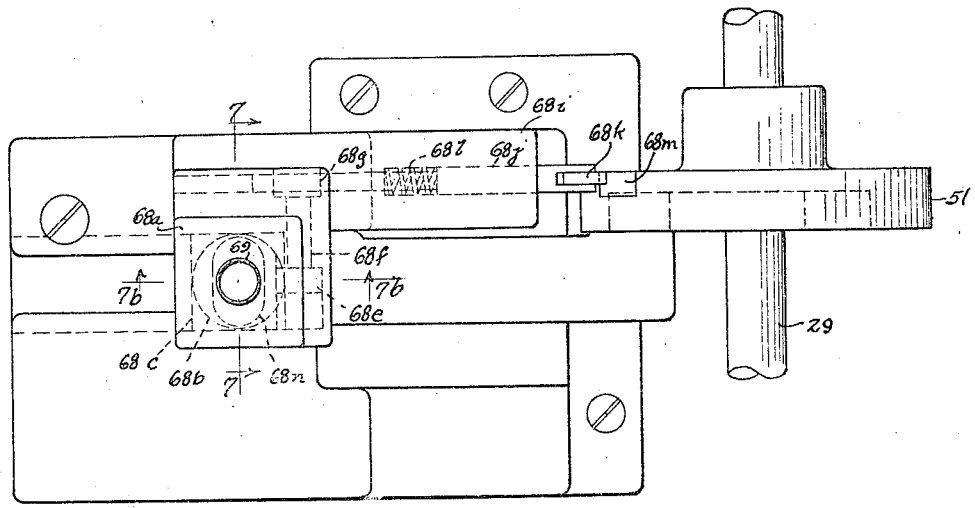
Figure 7B:
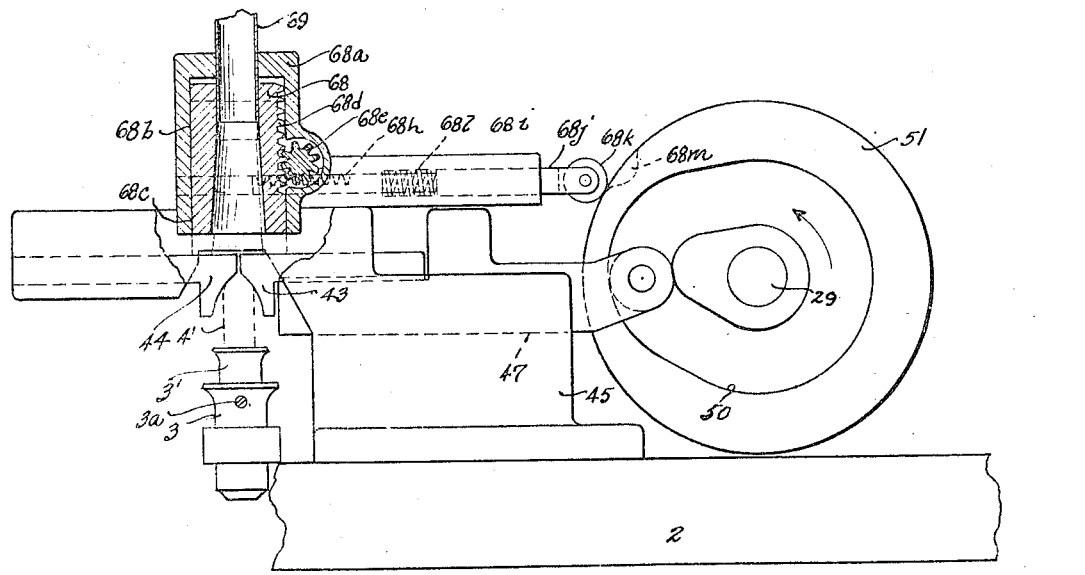

Fig. 7ª is a top plan view of the suction device for removing surplus paste from the tube closing jaws.

Fig. 7ᵇ is a partial side elevation and partial section substantially on line 7ᵇ—7ᵇ of Fig. 7ª.

Fig. 8 is a side elevation of the mechanism for folding over the end of the closed tube showing the elements separated to allow movement of the tube.

Fig. 9 is a side elevation of the mechanism of Fig. 8 showing the position of the elements immediately after the end of the tube has been turned over.

Fig. 10 is a similar view showing the positions of the elements after the elements for turning over the tube end have been withdrawn.

Fig. 11 is a similar view showing the position of the elements at the completion of the folding operation.

Fig. 12 is a sectional view substantially on line 12—12 of Fig. 10.

Fig. 13 is a plan view substantially on the line 13—13 of Fig. 10.

Fig. 14 is a section substantially on line 14—14 of Fig. 13.

Fig. 15 is a partial end elevation and a partial sectional view substantially on line 15—15 of Fig. 9.

Fig. 16 is a transverse section substantially on line 16—16 of Fig. 9.

Fig. 17 is a side elevation of the mechanism for sizing the closed end of the tube after it is folded.

Fig. 18 is a central longitudinal section through the mechanism for positioning the tube and clamping the sealing clip thereon.

Figure 20:
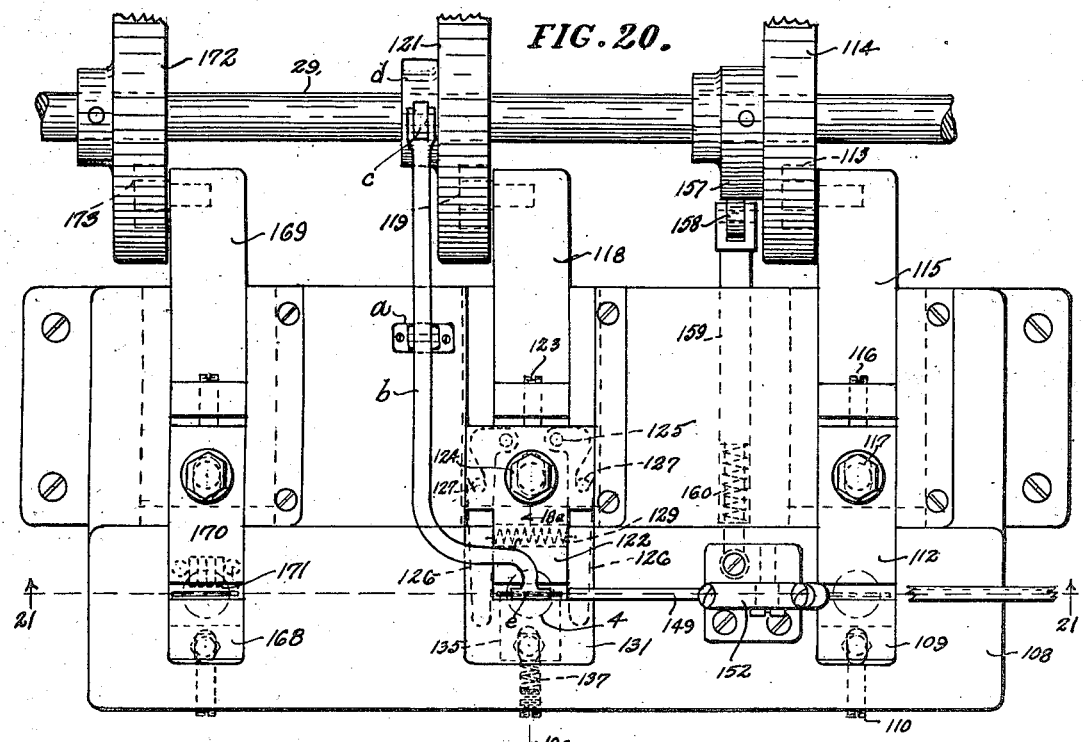

Fig. 18ª is a section showing the elements at the upper left hand part of Fig. 18, but on a larger scale, the section being substantially on line 18ª—18ª of Fig. 20.

Fig. 19 is a top plan view showing the mechanism for lifting the tubes into a position to be operated upon by the device shown in Fig. 18.

Fig. 20 is a top plan view of the sizing mechanism shown at Fig. 17, the clip applying mechanism shown in Fig. 18, and the dating mechanism.

Figure 21:
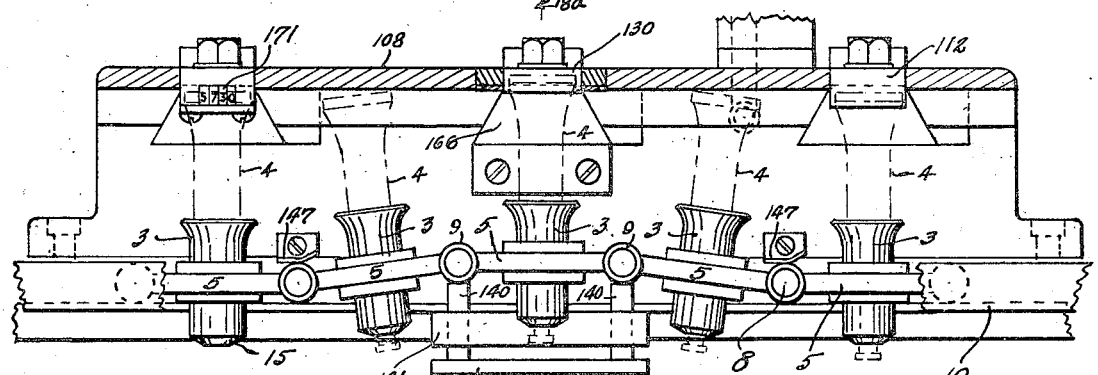

Fig. 21 is a transverse section substantially on line 21—21 of Fig. 20, the conveying mechanism, however, being shown in elevation.

Figures 22, 23, 24:
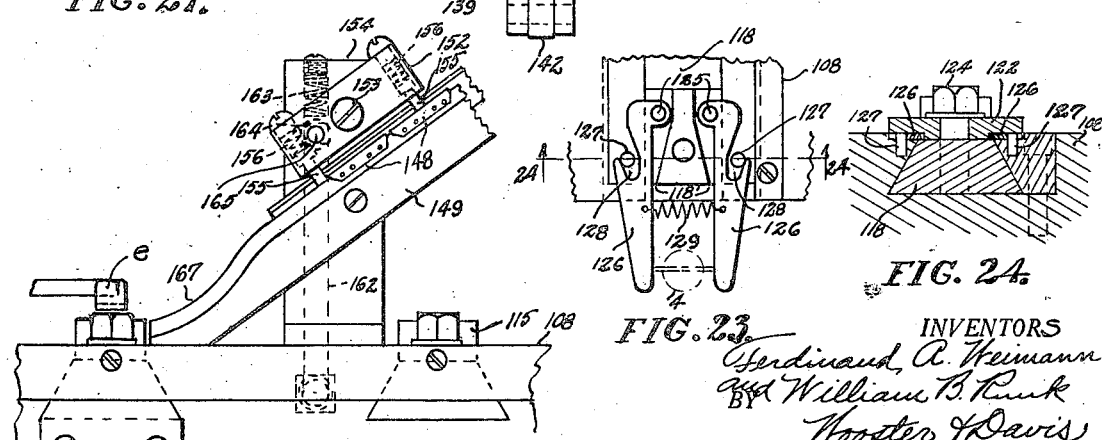

Fig. 22 is a front elevation of the lower end of the clip feeding chute, and showing the mechanism for regulating the feed of the clips.

Fig. 23 is a top plan view of the mechanism for centering the tubes in proper position to receive the clip, and Fig. 24 is a transverse sectional view substantially on line 24—24 of Fig. 23.

Figure 1:
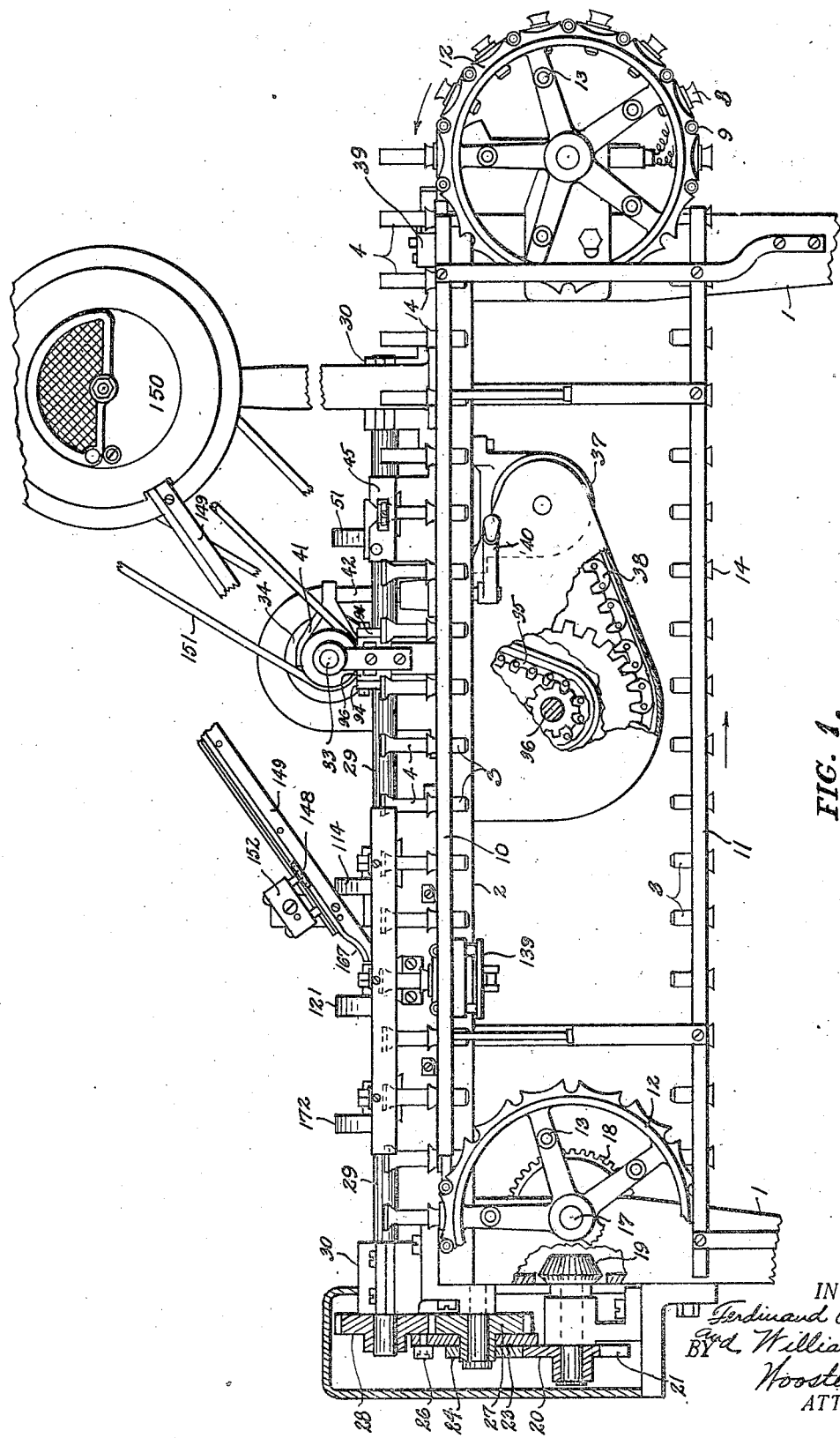
Fig. 1 is a front elevation of the machine with certain portions broken away to more clearly illustrate the construction.
Figure 2:
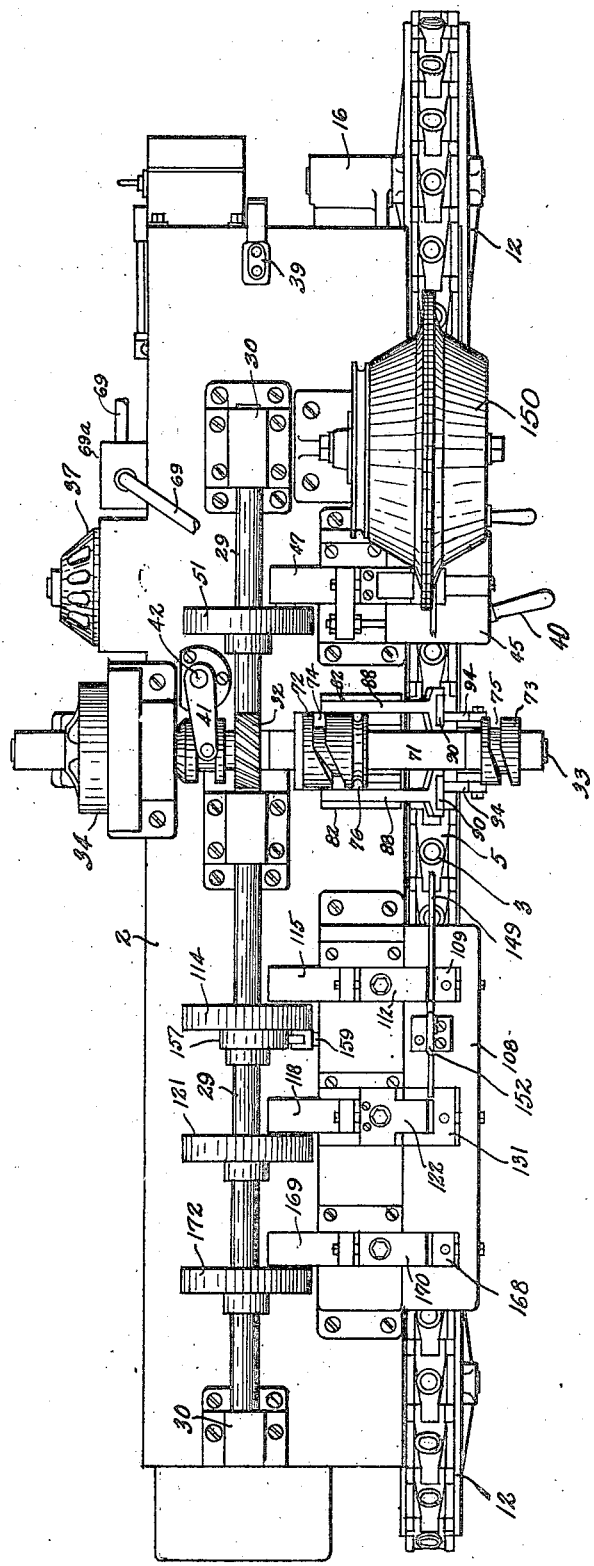
Fig. 2 is a top plan view thereof.
Figure 3:
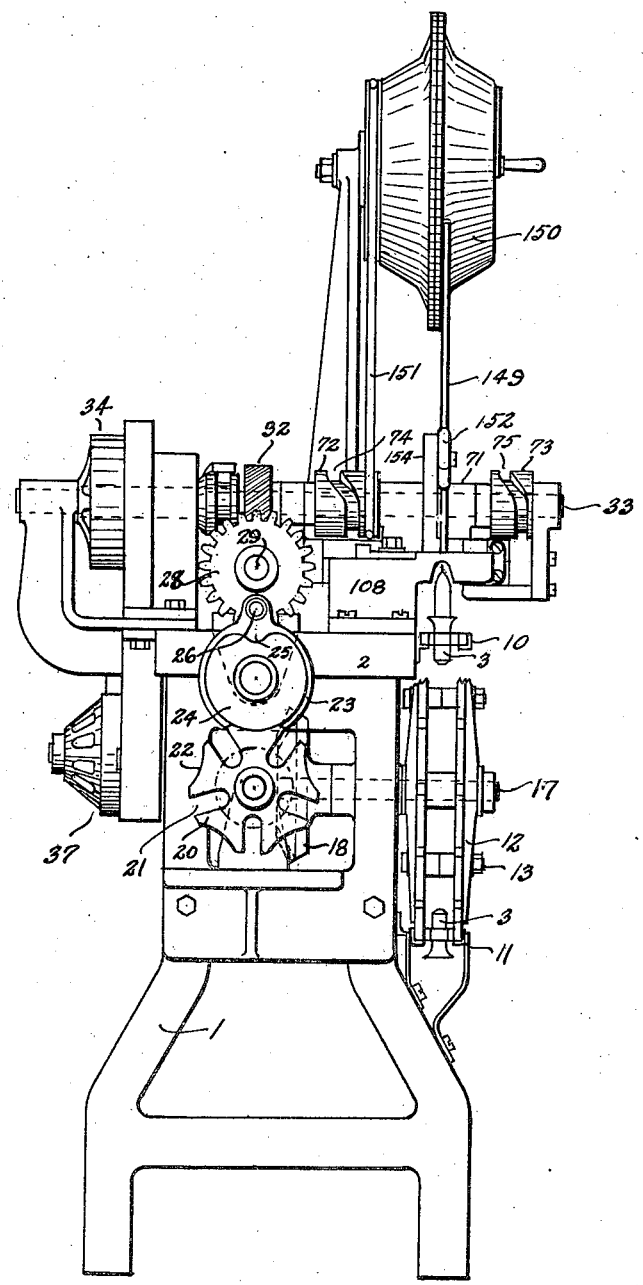
Fig. 3 is an end elevation looking from the left of Figs. 1 and 2.

As will be evident from an inspection of Figs. 1, 2, and 3 the machine is self contained, the entire mechanism being carried by a supporting frame including legs 1 at the opposite ends thereof and a table or plate 2 upon which the various mechanisms are mounted for performing the series of operations on the tubes. The tubes are carried to the various mechanisms by means of a conveyer, preferably an endless chain carrying suitable holders, indicated at 3, for supporting the tubes 4. This chain in the embodiment shown comprises links 5 substantially the shape shown in Fig. 19 with a single bearing 6 at one end and spaced bearings 7 at the opposite end, adapted to straddle the single bearing 6 of an adjacent link with a suitable pin 8 extending through the bearings to connect the links together and also forming a support for rollers 9 at its opposite ends adapted to run on suitable guides 10 and 11 forming upper and lower runways respectively for the chain. Adjacent the opposite ends of the machine are provided suitable sprocket wheels 12 for supporting the chain, and also driving the same. These sprocket wheels are preferably made double, as shown in Fig. 3, and secured together in proper spaced relation by tie-bolts 13 so as to leave space for the holders 3 for the tubes. These holders are preferably tubes flared at their upper ends 14 to facilitate insertion of the tubes, and having an inturned flange 15 at their lower ends to properly position the tubes in the holders. Either sprocket may constitute the driving sprocket, but we prefer to drive the sprocket at the left hand or outlet end of the machine, allowing the sprocket at the right hand or inward end to run idle, a simple bearing bracket 16 being provided to support the shaft from which this sprocket runs.

As the operations on the tubes are performed by spaced mechanisms operating in series, means is provided for giving the conveyer an intermittent movement, each movement being equal to or a multiple of the distance betwen the various mechanisms for performing these operations. It will also be apparent that the holders 3 should be spaced a distance corresponding to this movement, so that the tubes will be properly positioned with respect to the mechanisms. Various means may be provided for giving these intermittent movements to the conveyer, but we have found the Geneva movement to be very satisfactory, as the drive is positive and the conveyer is locked stationary between the movements. We have illustrated this Geneva movement in Figs. 1 and 3.

Connected to the driving shaft 17 is a bevel gear 18 meshing with a driving pinion 19, connected to be rotated by a slotted plate 20 of the Geneva movement, this plate being provided with the usual radial slots 21 and the curved recesses 22 in the periphery thereof adapted to coact with the driving element 23 which includes a plate 24 having a recess 25 at one side of the pin or roller 26. In operation, on each rotation of the element 23, pin or roller 26 will enter one of the slots 21 and rotate the plate 20 an amount equal to the distance between two of these slots, the recess 25 allowing movement of the high points at the opposite sides of these slots. Between these movements the periphery of plate 24 coacts with the curved recesses 22 to lock the plate 20 and the mechanism driven thereby against movement. The driving element 23 has a gear 27 attached thereto meshing with a gear 28 on the main shaft 29, extending longitudinally of and above the table, it being mounted in suitable bearings 30. Various mechanisms for performing certain of the operations on the tubes are also driven from this main shaft in a manner presently to be described. This shaft is driven by a spiral gear 31 meshing with a similar spiral gear 32 on a transverse shaft 33. The shaft 33 is, in turn, driven through the friction clutch 34 connected with a sprocket driven by belt or chain drive 35 from a counter shaft 36 driven from the motor 37 by a suitable silent chain drive 38, these various drives being preferably enclosed within suitable guard covers, as shown. The motor 37 is controlled by any suitable switch 39 preferably located on the machine while the friction clutch 34 is controlled by any suitable means such as lever 40 extending to a point adjacent the front of the machine and operating the fork 41 through the vertical shaft 42 whereby the machine may be stopped or started, as desired, independently of the motor control.

The mechanisms for closing and sealing the tubes will now be described. The first operation is closing the open bottom of the filled tube by flattening and pressing together the sides thereof. This operation is performed by the mechanism shown in detail in Figs. 4 to 7, and comprises two reciprocally mounted jaws 43 and 44 located on opposite sides of the path of movement of the tube and mounted to slide in a suitable support 45, there being a V-guideway 46 in which the sliding support 47 for the inner jaw 43 reciprocates. The outer jaw 44 is mounted to slide in guideway 48. The support 47 carries a roller 49 running in a cam groove 50 formed in the cam 51 mounted on the shaft 29. This cam groove is so shaped that during the movements of the tubes the jaws are stationary, but they are given one reciprocation for each revolution of the cam and while the conveyer is stationary. Connected to the support 47 is a rod 52 provided with gear teeth to provide a rack 53, this rod being mounted to reciprocate in a suitable opening through the over-hang of the support 45, and meshes with a gear 54 which, in turn, meshes with teeth 55 formed on the jaw 44 so that the two jaws will move simultaneously. Suitable means is provided for adjusting the rod 52 in the support 47 so as to properly position the jaws relatively to each other. This adjusting means may conveniently be nuts 56 threaded on this rod.

Figure 4:
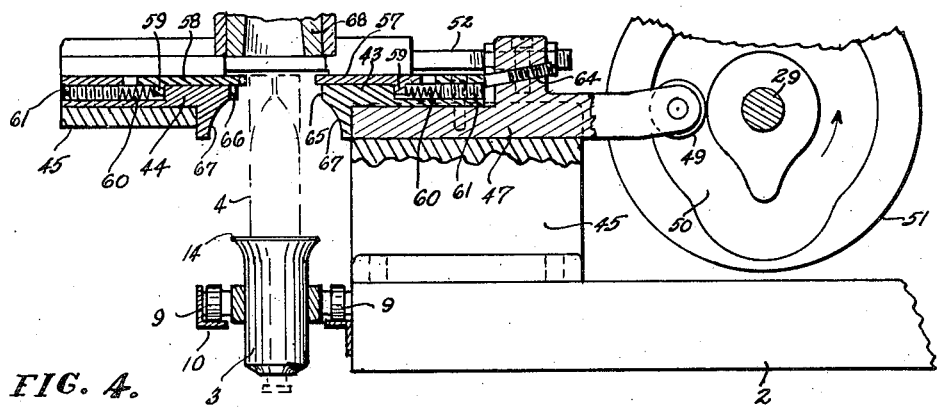
Fig. 4 is a longitudinal section of the mechanism for closing the end of the tube.
Figure 5:
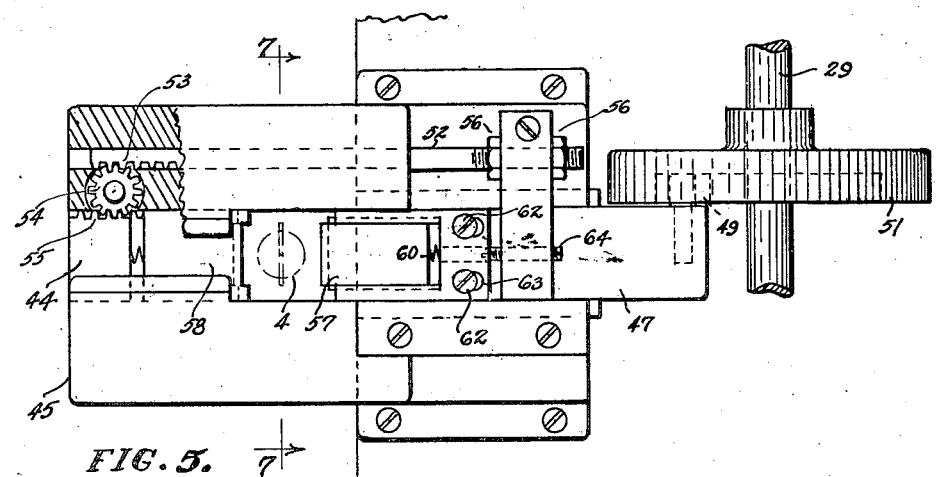
Fig. 5 is a top plan view thereof, the suction device being removed.
Figure 6:
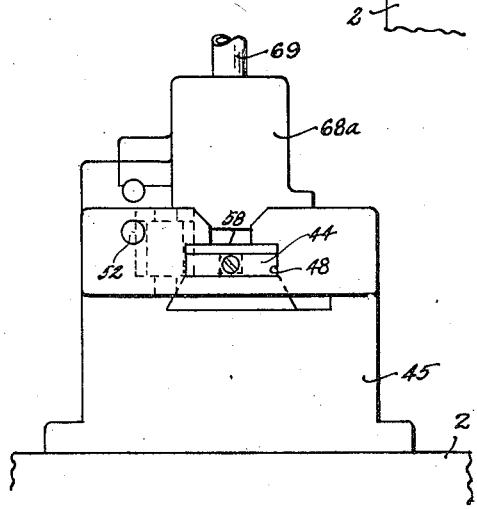
Fig. 6 is a front end elevation thereof.

In order to prevent the operation of closing the tube from forcing paste out this open end, but to force it downwardly within the tube, we provide on these jaws 43 and 44, supplementary jaws 57 and 58, which are mounted for relative slidable movement thereon, with suitable stop lugs 59 to limit their inward movement, and springs 60 tend to hold them in this inner position, these springs reacting at their opposite ends with adjusting screws 61 whereby the tension of the springs may be adjusted. The jaw 43 may also be adjusted on the support 47 by loosening screws 62 which pass through elongated slots 63, there being a screw 64 for adjusting this jaw after which it is clamped in adjusted position by tightening the screw 63. The inner ends of the supplementary jaws 57 and 58 normally project somewhat beyond the opposed edges of the main jaws 43 and 44, as shown in Fig. 4, so that when the jaws are brought together on opposite sides of the tubes these supplementary jaws will press together the free edges of the open end before the main jaws come together, and thus the pressing together of the walls of the tube will begin at the open end and move inwardly forcing the paste back into the tube. Beneath the vertical clamping faces 65 and 66 the jaws are curved, as shown at 67, to properly shape the closed end of the tube.

It very often happens that too much paste is placed in a tube and when the open end of the tube is closed this surplus paste will be forced out the top or open end during the closing operation. It is, therefore, desirable to remove this surplus paste to keep the jaws for closing the tube clean as otherwise this paste is liable to be transferred to other tubes which are later closed by these jaws. For the purpose of removing this surplus paste we mount above the closing jaws 43, 44, 57 and 58 a suction nozzle 68 connected by means of a pipe 69 with any suitable suction device not shown. If this nozzle were a stationary nozzle, in order to clean properly the suction would have to be so great that it would tend to remove paste from the open tube. In order to obviate this difficulty and also to allow use of a smaller amount of suction we provide means for vertically reciprocating the nozzle toward and from the end of the tube and the closing jaws in certain timing relation with the movements of these jaws.

We mount on top of the bracket 45 a housing or casing $68^a$ preferably circular in cross section in the upper portion thereof, as indicated at $68^b$ but rectangular adjacent its lower end at $68^c$ to prevent the nozzle rotating in the casing. The nozzle is provided on the outer wall thereof with gear teeth forming a rack $68^d$ meshing with a pinion $68^e$, mounted on a shaft $68^f$ upon which is mounted a second pinion $68^g$, the second pinion meshing with a second rack $68^h$ which is mounted to reciprocate in a bearing $68^i$. This rack is part of a rod $68^j$ carrying at its outer end a roller $68^k$, held against the rim of the cam 51 by a spring $68^l$, this cam being provided with a notch $68^m$ so located at to reciprocate the rod $68^j$, and thus reciprocate the nozzle 68 in certain timing relation with the movements of the slide 47 and the jaws operated thereby. The nozzle has sliding engagement with the free end of the pipe 69 and the inlet opening at the lower end of the nozzle is preferably elongated, as shown at $68^n$, Fig. $7^a$. In the pipe 69 and preferably mounted on the rear of the frame of the machine, as shown in Fig. 2 is a receptacle $69^a$ into which the surplus paste is discharged and from which it is reclaimed. In operation the nozzle 68 is normally held in its elevated position. Immediately the jaws 43, 44, 57 and 58 press the sides of the tube together, the roller $68^k$ comes in alignment with the recess $68^m$ and the rod $68^j$ is moved to the right, as shown in Figs. $7^a$ and $7^b$ by the spring $68^l$ to allow the nozzle 68 to drop and bring the lower end thereof in contact with the top surface of the jaws 57, 58. As the inlet to the nozzle is, at this time, practically shut off, a partial vacuum is created within the nozzle, and as soon as the nozzle is raised from the jaws under the action of recess $68^m$ in cam 51 there will be a rush of air along the top surface of the jaws under the lower edge of the nozzle which will loosen and remove any surplus paste which happens to have been forced from the collapsible tube. This paste will be conducted by the air current through pipe 69 to receptacle $69^a$ where it is retained and may be reclaimed.

The next operation after the sides of the tubes are pressed together is the folding operation and to make a good joint the flattened free edge is folded upon itself twice. The mechanisms for performing these two folding operations are the same and are operated from the same driving mechanism. The second folding device, however, is placed lower than the first by the amount of the fold performed in the first device as the tube is shortened by that amount. This folding mechanism is shown in detail in Figs. 8 to 16. Mounted upon the table 2 is a bracket 70 provided with a bearing 71 for the transverse shaft 33, and mounted on this shaft are two cams 72 and 73 having cam grooves 74 and 75 in their peripheries respectively. The cam 72 is also preferably provided with a circumferential groove 76 adapted to coact with a round belt for driving the feed hopper for feeding the clips, as presently will be described.

Reciprocally mounted upon the bracket 70 on one side of the path of movement of the tube is a slide 77 carrying a roller 78 adapted to coact with the cam groove 74 whereby this slide is reciprocated. Carried by the slide are anvils 79 having shanks 80, preferably rectangular in cross section, slidable in similarly shaped guideways 81 in the slide whereby the anvil is kept from turning. The guideways 81 are closed on the outer side by plates 82 secured to the slide by any suitable means such as screws 83. Carried by the shank 80 is a pin 84 projecting into an elongated slot 85 in the plate 82 so that the anvil has limited movement relative to the slide.

Within the guideway 81 and bearing against the end of the shank is a spring 86 tending to hold the anvil in its advanced position, as shown in Fig. 8, this spring reacting at its opposite end against a suitable stop means, such as a plate 87.

Also carried by the slide 77 above the anvil is a folding element comprising a lever 88 pivoted to the slide 77 between it and the plate 82 by a suitable pin 89 and provided at its free end with a roller 90. This roller is held against the top of the anvil by a suitable spring 91.

Reciprocally mounted on the bracket 70 on the other side of the path of movement of the tube 4 is a third element 92 adapted to coact with the anvil and folding element to perform the folding operations on the tube. This element comprises a free edge and is concave on its upper side adjacent this free edge, as shown at 93. This element is carried on one arm of the bell crank lever 94, fulcrumed at 95, on a slide 96, this slide being mounted to reciprocate in suitable guideways 97 in the bracket 70, and carries a roller 98 adapted to coact with the cam groove 75 whereby this slide is reciprocated. The slide 96 is recessed to provide opposed spaced shoulders 99 and 100 and seated upon the upper wall 101 and between the shoulders is a block 102 to which the other arm of the bell crank 94 is pivoted, as shown at 103. The width of this block is somewhat less than the distance between the shoulders 99 and 100 so that the slide 96 may have a given amount of movement independently of this block. Carried in the upper horizontal portion of this block, preferably in a suitable recess therein, is a friction plate 104 which is held in engagement with the top wall 101 of the bracket by springs 105 between this plate and suitable adjusting screws 106. See particularly Figs. 13 and 14. The operation of this folding mechanism is as follows:

Assuming the elements are separated, as shown in Fig. 8, to allow movement of the tube 4 to a position between them, as shown in dotted lines. When this tube is in position the cams 72 and 73 move the slides 77 and 96 towards each other to the position, shown in Fig. 9. As these slides move together the ends of the anvil 79 and the third element 92 clamp the opposite sides of the flattened end of the tube, as shown in Fig. 9. The slide 96 is then held stationary while the slide 77 continues to advance. As the anvil cannot move any farther, the spring 86 allows the slide 77 to move relatively thereto, while this spring holds the anvil tightly against the side of the tube. As the slide 77 continues to advance and the anvil remains stationary, the roller 90 passes over onto the element 92 and folds the free end of the tube over the edge of the element 92, as shown in Fig. 8. The slide 77 is now retracted by the cam 72, bringing the roller back on to the anvil, as shown in Fig. 10, the anvil being retained against the side of the tube during this return movement of the slide by means of spring 86. The slide 77 now remains stationary and the slide 96 is retracted by the cam 73. It will be apparent from an inspection of Figs. 9 and 10 that during the first part of this retracting movement of the slide 96, the block 102 and its pivotal connection 103 with the bell crank 94 will remain stationary until the shoulder 99 comes in contact with the inner side of this block, the block being held stationary by the action of the friction plate 104. During this movement of the slide 96, as the fulcrum 95 of the bell crank moves relatively to the pivot 103, it will swing the free edge of the element 92 downwardly and backwardly, away from the folded over edge of the tube. As soon as the shoulder 99 comes in contact with the side of the block 102 this block and the bell crank will move backwardly with the slide to the full line position, shown in Fig. 10. The slide 96 is now advanced by the cam 73 and during the first part of this advanced movement the block 102 remains stationary under the action of friction plate 104 until shoulder 100 comes in contact with the outer side of the block 102. During this part of the movement fulcrum 95 moves forwardly about the pivot 103 and raises the free end of member 92 to the dotted line position shown in Fig. 10, in alignment with the anvil 79. As the shoulder 100 is now in contact with the block 102 further advanced movement of the block will advance the free edge of member 92 horizontally and will clamp the end of the tube between this free edge and the anvil, folding the turned over free edge of the tube, as indicated at 107 in Fig. 10, against the body of the tube, as shown in Fig. 11. The free end of the tube has now been folded upon itself, and the slide 77 and 96 are retracted by their respective cams to the position shown at Fig. 8, in position to perform the same operation upon the next tube.

It will be apparent from an inspection of Figs. 12 to 16 that this folding mechanism is duplicated upon opposite sides of the bracket 70 so that two folding operations are performed on the tube to give a double fold. The second folding mechanism, indicated at the left in Fig. 16, is located lower than the first folding mechanism shown at the right of this figure by an amount equal to the length of the tube which is folded over by the first folding mechanism. These two folding mechanisms are spaced from each other a distance equal to the amount of movement imparted to the conveyer carrying the tubes 4 in one step by the Geneva movement. These folding mechanisms are also carried by the slides 77 and 96 so that they are both operated by the cams 72 and 73.

After the double folding operation of the ends of the tubes the sealing clips are placed over these folded ends and clamped tightly on the same to seal the tubes. The placing of the clips on the tubes and the clamping of the same thereon is performed by the mechanism shown in detail in Figs. 17 to 24 inclusive.

In order that the folded ends of the tubes shall be of uniform thickness when they reach the clip applying mechanism we provide means for performing on them what we term a sizing operation, which comprises merely pressing the folded end between two jaws. These jaws are shown in Figs. 17, 20, and 21. A bracket 108 is secured to the table of the machine beyond the folding mechanism just described. Mounted in this bracket is a stationary jaw 109 adapted for adjustment by adjusting screw 110, and adapted to be secured in adjusted position by screw 111. Adapted to coact with this stationary jaw is a slidable jaw 112, mounted in suitable guideways in the bracket, and reciprocated by means of a roller 113 adapted to coact with a cam groove in the cam 114. This movable jaw comprises a main body portion 115 upon which the jaw proper 112 is adjustably mounted. This jaw proper may be adjusted to desired position on the body portion by the adjusting screw 116 and secured in the adjusted position to give the desired thickness to the folded end of the tube by the clamping screw 117. After the tubes are sized they are advanced to the position where the clips are applied and clamped.

This mechanism for applying the clip is shown in detail in Figs. 17 to 24 inclusive. Mounted to slide in the bracket 108 is a slide 118 carrying a roller 119, running in a cam groove 120 formed in the cam 121 secured to shaft 29 whereby this slide is reciprocated. Carried by this slide and adjustably mounted thereon is a jaw 122. The position of this jaw may be adjusted by the adjusting screw 123 and it may be secured in the adjusted position by tightening up a screw 124. The slide 118 carries a pair of pins 125 upon which are pivoted a pair of centering fingers 126, the jaw 122 being recessed and extending over these fingers to retain them in position on the pivots. Carried by the stationary bracket 108 is a pair of stationary pins 127 which are adapted to coact with inclined recesses 128 and the two fingers are connected by means of a spring 129 tending to draw the free ends thereof together. It will be apparent that as the slide 118 is reciprocated the free ends of these fingers will move toward and from each other under the action of spring 129 and the coaction of pins 127 with the inclined outer wall of the recesses 126. Opposed to clamping face 130 of jaw 122 is a stationary jaw 131 on the opposite side of the path of movement of the tubes to be operated upon secured in position by screw 132. This jaw is inclined on its under side beneath its clamping face, as shown at 134, and mounted in this jaw is a plate 135 adapted for a certain amount of movement relative to the jaw and normally held in a position where its free edge 136 projects beyond the face of the jaw 131, and it is normally held in this position by a spring 137. Suitable stop means such as the screw 132 extending through an elongated opening 133' in the plate being provided to limit this movement. The plate is also provided with a stop shoulder 138 adapted to coact with a similar shoulder on the bracket to limit the retracting movement of the plate.

Beneath these jaws is provided means for lifting the individual tubes to the space between the jaws. This comprises a support 139, carrying four upright rods 140 guided in a bracket 141, which rods are arranged directly below the four rollers 9 of a link 5 of the conveyer, so that as the support 139 is elevated the link immediately there above will be elevated with the tube 4 carried thereby and will place its folded end between the jaws. The support 139 is pivoted to a lever 142 fulcrumed to the table at 143 and which carries at its opposite ends a rod 144 in which is mounted a roller 145 coacting with the outer wall of the cam 146, so that, as the cam rotates the rod 144 will be depressed to lift the support 139 and the tube carried by the corresponding link. Suitable guides 147 as shown in Fig. 21, are provided on opposite sides of this support to prevent lifting of the remaining links of the chain from the runway 10 when the link over this support is lifted.

The clips indicated at 148 Figs. 18 and 22 are automatically placed over the folded ends of the tubes by suitable mechanism such as that shown in Figs. 17 and 22. An inclined chute 149 leads from a suitable hopper 150 which hopper is constructed to automatically place the clips on this chute. This hopper is driven by the belt 151. Various types of hoppers may be used but we prefer that disclosed in the application of William B. Runk, filed of even date herewith. This hopper merely insures that the chute is always supplied with plenty of clips as required by the clip applying mechanism. The discharge of the clips from the chute is automatically regulated by a rocker 152 pivoted at 153 on an upright 154. Carried by the rocker on opposite sides of the pivot and immediately above the chute are two plunger pins 155 which are normally pressed against the top of the chute or a clip thereon by springs 156. The rocker 152 is rocked in certain timing relation with the tube advancing and lifting mechanism by means driven from the cam 157 carried on the shaft 29. Adapted to coact with the surface of this cam is a roller 158 carried by a reciprocating rod 159, this roller being held against the surface of the cam by a spring 160 and the outer end of this rod is inclined or beveled, as shown at 161, Fig. 17. Coacting with this rod is another rod 162 mounted to reciprocate vertically in the upright 154, this rod being also inclined or beveled at its lower end to coact with the inclined end 161 of the rod 159.

A spring 163 is provided which tends to push this rod downwardly. This rod 162 is also provided with a notch 164 into which a pin 165 carried by the rocker 152 projects so that, as the rod 159 is reciprocated the action of this rod and the spring 163 will reciprocate the rod 162 up and down and rock the rocker 152 on its pivot. As the rod 162 is lifted the upper pin 155 will be pressed against the top of a clip on the chute and will retain the same thereon. While the lower pin 155 will be removed from in front of the lower clip and allow it to slide down onto the tube which at this time is in position to receive it. The rod 159 is then retracted allowing rod 162 to drop which will bring the lower plunger 155 into a position to prevent further clips from passing off the chute, but will release the clip held by the upper pin 155.

The operation of the clip applying mechanism is as follows:

The tube, after it leaves the sizing device, comprising the jaws 109 and 112 is advanced to a position over the support 139. This support is then raised by the cam 146 as described above, raising the tube to a position between the jaws 122 and 131, as shown on dotted lines in Figs. 18, 18ª, 20 and 21. As the tube is raised it will be guided to the space between the jaws by the inclined walls 134 and 166. If it happens to be turned in its holder 3 so that the flattened folded edge lies at an angle to the face of the jaws the plate 135 will yield to allow it to push by the edge thereof, and then the spring 137 will advance this plate and turn the tube in its holder so that the flattened edge is parallel with the face of the jaws. Although the tube is then in alignment with the chute 149 for the clips, it may not be properly centered with respect to the jaws and the ends of the space 130' between these jaws which is of a length substantially equal to the length of the clips to be applied to the tubes, that is, it may be either too far away or too near the end of the chute, so that the clip would not be centered on the tube. As the jaw 122 was advanced, the centering fingers 126 are also advanced and the free ends thereof drawn together on opposite ends of the flattened portion of the tube by means of spring 129, and as this spring is secured at its opposite ends to these fingers, the tube will be centered with respect to the jaws and the opening 130'. The inward movement of the fingers is limited by the stop shoulders 118'. At this time the release mechanism 152 to 155 will allow a clip to slide off the chute onto the end of the tube. The upper edge of the chute is preferably concaved, as shown in Fig. 22 at 167 to turn the clip so that it will be substantially horizontal, as it drops onto the tube. Immediately this clip is in position on the tube the clamping jaw 122 is further advanced to press the clip against the jaw 131 and clamp the clip on the tube. The jaw 122 is now retracted, the tube dropped and advanced where it may be dated.

We sometimes find it desirable instead of depending on the weight of the clip 148 to properly seat it on the folded end of the tube to provide positive means for doing this. Thus if for any reason the clip should be slightly too narrow or the folded end of the tube too thick the machine would not fail to operate. We have shown in Figs. 18 and 20 a very simple device for performing this operation. Pivoted in a suitable support $a$ on the bracket 108 is a lever $b$ carrying at one end a roller $c$ coacting with a cam $d$ on shaft 29. At its other end the lever $b$ is provided with a grooved head $e$ in alignment with the end of the tube and this head is normally held elevated and the roller $c$ against its cam by any suitable spring $f$. The raised portion $g$ of the cam $d$ is so located relative to the cam 120 for operating the jaw 122 and the clip feeding mechanism, that as soon as a clip drops from the chute 149 onto the end of the tube and before the jaw 122 clamps the same, the head $e$ is depressed and if the clip is not already properly positioned on the end of the tube, it will be forced down into place by this head. The head is removed from the clip before it is clamped by the jaw 122.

Smaller tubes such as sample tubes may be closed and sealed by the same mechanism it being necessary merely to place in the holders 3 suitable inserts shown at 3' in Fig. 7ᵇ of a size to bring the smaller tubes, as indicated at 4' into proper position with respect to the closing and sealing mechanisms. The inserts 3' may be secured in position by suitable means as screws 3ᵃ.

The dating mechanism is shown in Figs. 20 and 21 and may comprise merely a stationary adjustable jaw 168, and a slide 169 carrying adjustably mounted thereon another jaw 170 which jaw carries suitable dating elements 171. This slide and movable jaw are reciprocated by cam 172 secured on the shaft 29 and having a cam groove in which a roller 173 carried by the slide 169 projects. As the finished tubes are advanced to positions between these jaws the dating elements are pressed against the same as will be obvious.

It will be apparent from the foregoing description that the tubes are automatically closed, then closed and folded upon itself, and the sealing clips applied and clamped over this folded end entirely automatically. As the tubes are sized and properly centered before the clip is applied the finished tubes are entirely uniform, there being no variation in position of the clips as is the case when they are applied manually.

Having thus set forth the nature of our invention what we claim is:

1. In a machine for closing filled collapsible tubes, means for closing the open ends of the tubes, comprising jaws movable toward and from each other, means for operating the jaws, said jaws being arranged to close the open end of the tube in two steps upon a single operation of the jaws toward each other, the first step pressing the sides together at the end of the tube and the second step pressing the sides of the tube together closely adjacent and inwardly of the walls first brought together.

2. In a machine for closing filled collapsible tubes, a slidable main jaw, an auxiliary jaw slidable relatively to the main jaw, means for moving one of said jaws to close the open end of the tube by pressing together a portion of the side walls thereof and then the other jaw to press together a portion of the walls adjacent to those first operated upon.

3. In a machine for closing filled collapsible tubes, a movable main jaw, an auxiliary jaw carried by the main jaw and adapted for movement relative thereto, and means for pressing said jaws against a tube to close the open end of the same, said jaws being so arranged that one of them will engage and complete its operation on the tube prior to the other.

4. In a machine for closing filled collapsible tubes, a movable main jaw, an auxiliary jaw carried by the main jaw and adapted for movement relative thereto and also adapted to project beyond the face of the main jaw, yielding means tending to hold the auxiliary jaw in this position, and means for pressing the jaws against a tube to close the open end of the same.

5. In a machine for closing filled collapsible tubes, a pair of opposed movable jaws, a pair of opposed auxiliary jaws carried by said jaws adapted for movement relative thereto and also to project beyond the operative faces thereof, means for simultaneously moving the jaws together, and means for holding a tube between said jaws with the portion thereof nearest its open end in alignment with the auxiliary jaws.

6. In a machine for closing filled collapsible tubes, a slidable means for pressing together the walls adjacent the open end of the tube to close the same, and auxiliary slidable means for then pressing together the walls adjacent the closed walls, said first mentioned closing means being arranged to hold the walls closed while the second closing means operates.

7. In a machine for closing filled collapsible tubes, means for pressing together the sides of the open end of the tube to close the same, and means to remove surplus material which may be pressed from the tube in the closing operation.

8. In a machine for closing filled collapsible tubes, means for pressing together the sides of the open end of the tube to close the same, and means to remove surplus material which may be pressed from the tube in the closing operation comprising a suction nozzle located adjacent the end of the tube and a conveying pipe leading from said nozzle.

9. In a machine for closing filled collapsible tubes, means for pressing together the sides of the open end of the tubes to close the same, and means to remove surplus material which may be pressed from the tube in the closing operation comprising a suction nozzle located with its inlet in alignment with the end of the tube, and means for moving said inlet toward and from the tube.

10. In a machine for closing filled collapsible tubes, means for pressing together the sides of the open end of the tubes to close the same, and means to remove surplus material which may be pressed from the tube in the closing operation comprising a suction nozzle, and means for moving said nozzle to a position closely adjacent the end of the tube immediately after the closing operation and then removing the same therefrom.

11. In a machine for closing filled collapsible tubes, one or more movable jaws for pressing together the sides of the open end of the tubes to close the same, means for operating said jaw or jaws, a suction nozzle above said jaw or jaws in alignment with the end of the tube, and means for moving the inlet end of said nozzle against the top of the jaws immediately after the tube has been closed and then removing the same from said jaws.

12. In a machine for closing filled collapsible tubes, a movable jaw for pressing together the sides of the open end of a tube to close the same, means for operating said jaw, a suction nozzle above said jaw in alignment with the end of the tube, and means for moving said nozzle toward and from the jaw in certain timing relation with the movements of the jaw.

13. In a machine for closing filled collapsible tubes, means for pressing together the sides of the open end of the tube to close the same, means for folding upon itself the flattened end of the tube comprising an anvil, a holding means, means for pressing the anvil and holding means against the opposite sides of the flattened tube, means for bending the flattened end over the holding element, and means for then separating the anvil and holding element and then pressing them together to fold the bent end against the body of the tube.

14. In a machine for closing filled collapsible tubes, means for pressing together the sides of the open end of the tube to close the same, a pair of supports on opposite sides of said tube, slides mounted on and embracing said supports, means for advancing the tubes in a step by step movement from said closing means between the supports, means carried by said slides on the forward sides of said supports for folding upon itself the flattened end of the tube, means carried by the slides at the rear of the supports for folding upon itself the folded end of the tube, and means for moving the slides toward and from each other to operate the folding means.

15. In a machine for closing filled collapsible tubes, means for pressing together the sides of the open end of the tube to close the same, a pair of supports on opposite sides of said tube, slides mounted on and embracing said supports, means for advancing the tubes in a step by step movement from said closing means between the supports, means carried by said slides on the forward sides of said supports for folding upon itself the flattened end of the tube, means carried by the slides at the rear of the supports for folding upon itself the folded end of the tube, a shaft extending transversely of the direction of movement of the tube, cams carried by said shaft, means carried by the slides coacting with said cams for reciprocating the slides toward and from each other to operate the folding means, and means for rotating the shaft.

16. In a machine for closing filled collapsible tubes, means for pressing together the sides of the open end of the tube to close the same, and means for folding upon itself the flattened end of the tube comprising an anvil on one side of the tube adapted for horizontal movement, a holding means on the other side of the tube mounted for up and down and horizontal movements, means for moving the anvil and holding means horizontally to press them against the opposite sides of the flattened tube, means for bending the flattened end over the holding element, and means for preventing up and down movement of the holding element while it is pressed against the tube.

17. In a machine for closing filled collapsible tubes, means for pressing together the sides of the open end of the tube to close the same, and means for folding upon itself the flattened end of the tube comprising an anvil on one side of the tube, a holding element on the opposite side of the tube and adapted to coact with the anvil to grip the tube, a slide movable toward and from the tube to which the holding element is fulcrumed, said holding element having an arm, means connected to said arm coacting with the slide on the first part of the movement toward the tube to rock the holding element on its fulcrum and on the latter part of said movement to hold it against movement about said fulcrum, and means for bending the flattened end of the tube over the holding element.

18. In a machine for closing filled collapsible tubes, means for pressing together the sides of the open end of the tube to close the same, and means for folding upon itself the flattened end of the tube comprising an anvil on one side of the tube, a holding element on the opposite side of the tube and adapted to coact with the anvil to grip the tube, a slide movable toward and from the tube to which the holding element is fulcrumed, means connected to said holding element coacting with the slide on the first part of the movement toward the tube to rock the holding element on its fulcrum to bring it into alignment with the anvil and on the latter part of said movement to prevent movement of the holding element about its fulcrum, means for bending the flattened end of the tube over the holding element, and means for then moving the slide away from the tube, the means connected to the holding element adapted on this latter movement to rock the element about its pivot in the opposite direction.

19. In a machine for closing filled collapsible tubes, means for pressing together the sides of the open end of the tube to close the same, and means for folding upon itself the flattened end of the tube comprising an anvil on one side of the tube, a holding element on the opposite side of said tube and adapted to coact with the anvil to grip the tube, a slide movable toward and from the tube upon which the holding element is mounted, means adapted during the first part of the movement of the slide toward the tube to move the holding element upwardly into alignment with the anvil and during the latter part of said movement to prevent upward movement of said element, means for bending the flattened end of the tube over the holding element, and means for then moving the holding element downwardly and away from the tube and then repeating the first movements thereof toward the tube to press the bent end against the body of the tube.

20. In a machine for closing filled collapsible tubes, means for pressing together the sides of the open end of the tube to close the same, and means for folding upon itself the flattened end of the tube comprising a slide on one side of the tube, an anvil carried by the slide and adapted for limited movement relative thereto, a spring tending to hold the anvil in its advanced position, a holding element on the opposite side of the tube and adapted to coact with the anvil to grip the tube, a second slide to which the holding element is fulcrumed, a support for said slide, a block, said holding element being provided with an arm pivoted to said block, means tending to hold the block stationary, means forming a lost motion connection between the block and the second slide, a folding means carried by a lever pivoted to the first slide, means for yieldingly holding the folding means against the top of the anvil, and means for reciprocating the slides.

21. In a machine for closing filled collapsible tubes, means for pressing together the sides of the open end of the tube to close the same, and means for folding upon itself the flattened end of the tube comprising an anvil and a folding element on one side of the tube, a holding element on the other side of the tube adapted to coact with the anvil and folding element, a movable slide to which the holding element is fulcrumed provided with spaced shoulders, a block between said shoulders of less width than the distance between said shoulders, said holding element having an arm pivoted to said block, means tending to prevent movement of the block but arranged to allow movement thereof when engaged by the shoulders, and means for reciprocating the slide.

22. In a machine for closing filled collapsible tubes, means for pressing together the sides of the open end of the tube to close the same, and means for folding upon itself the flattened end of the tube comprising an anvil and a folding element on one side of the tube, a holding element on the other side of the tube adapted to coact with the anvil and folding element, a movable slide to which the holding element is fulcrumed provided with spaced shoulders, a support on which the slide is mounted, a block between said spaced shoulders and of less width than the distance between the shoulders, said holding element having an arm pivoted to said block, a friction plate carried by the block engaging said support, and means for reciprocating the slide.

23. In a machine for closing filled collapsible tubes, means for pressing together the sides of the open end of the tube to close the same, means for folding upon itself the closed end of the tube, means for placing a substantially U-shaped clip over the folded end, means movable longitudinally of the tube for forcing the clip into position, means for operating said latter means in certain timing relation with the clip placing means, and means for clamping the clip on said end.

24. In a machine for closing filled collapsible tubes, means for pressing together the sides of the open tube to close the same, means for placing a clip over the closed end of the tube, means for positioning the clip, separate means for centering the tube with respect to the clip, and means for clamping the clip on the tube.

25. In a machine for closing filled collapsible tubes, means for pressing together the sides of the open tube to close the same, a pair of spaced jaws, means for placing the closed end of the tube between said jaws, means for reciprocating one of the jaws, means for placing a clip over the closed end of the tube in position to be clamped by said jaws, guide means at the ends of the clip for positioning said clip, a pair of fingers pivoted to the movable jaw and adapted to engage the tube on opposite sides thereof to center the same with respect to the clip, and means for moving said fingers toward and from each other as the jaw is reciprocated.

26. In a machine for closing filled collapsible tubes, means for pressing together the sides of the open tube to close the same, a support, a pair of clamping jaws carried by said support, one of said jaws being reciprocable, means for placing the closed end of a tube between said jaws, a pair of pivoted fingers on opposite sides of and adapted to engage the tube to center the same, means effective by relative movement of said jaw and support for bringing the fingers against the tube to center the same, means for reciprocating the movable jaw, means for placing a clip over the closed end of the tube in position to be clamped by said jaws, and means independent of said fingers for positioning the clip.

27. In a machine for closing filled collapsible tubes, means for pressing together the sides of the open tube to close the same, a support having an opening therein, jaws on the opposite side of said opening one of which jaws is movable toward and from the other jaw to clamp the end of a tube between the same, a chute in alignment with said opening adapted to supply a clip for the end of the tube, means for raising the tube to bring the closed end thereof between said jaws, a plate yieldably mounted in one of the jaws and adapted when the tube is raised to engage the side thereof and place it in alignment with the chute, and means for reciprocating the movable jaw to clamp the clip on the tube.

28. In a machine for closing filled collapsible tubes, means for pressing together the sides of the open tube to close the same, a support having an opening therein, jaws on the opposite side of said opening one of which jaws is movable toward and from the other jaw to clamp the end of a tube between the same, a chute in alignment with said opening adapted to supply a clip for the end of the tube, means for placing the closed end of the tube between said jaws, means for placing the said closed end in alignment with the chute, and means for reciprocating the movable jaw to clamp the clip on the tube.

29. In a machine for closing filled collapsible tubes, means for pressing together the sides of the open tube to close the same, an inclined chute adapted to hold a supply of clips for sealing the end of the tube, means for placing the closed end of the tube in position to receive a clip from said chute, means allowing the clips to leave the chute one at a time comprising a rocking member above the chute having spaced spring pressed members engaging the clips and means for rocking said member in certain timing relation with said tube positioning means, and means for clamping a clip on the tube.

30. In a machine for closing filled collapsible tubes, means for pressing together the sides of the open tube to close the same, a support having an opening therein, jaws on the opposite sides of said opening one of which jaws is slidable in the support, spaced fingers pivoted on the movable jaw and adapted to engage the tube on opposite sides thereof to center the tube relative to said opening, said fingers having walls inclined to the direction of movement of a jaw, pins carried by the support and adapted to engage said inclined walls, means for depositing a clip on the closed end of a tube in said opening, and means to reciprocate the movable jaw to clamp the clip to the tube.

31. In a machine for closing filled collapsible tubes, means for pressing together the sides of the open tube to close the same, a support having an opening therein, jaws on the opposite sides of said opening one of which jaws is slidable in the support, spaced fingers pivoted on the movable jaw and adapted to engage the tube on opposite sides thereof to center the tube relative to said opening, said fingers having walls inclined to the direction of movement of the jaw, pins carried by the support and adapted to engage said inclined walls, a spring secured at its opposite ends to said fingers and tending to draw them together, means for depositing a clip on the closed end of a tube in said opening, and means to reciprocate the movable jaw to clamp the clip to the tube.

In testimony whereof we affix our signatures.

FERDINAND A. WEIMANN.
WILLIAM B. RUNK.